(12) United States Patent
Kodaypak et al.

(10) Patent No.: US 11,558,907 B2
(45) Date of Patent: Jan. 17, 2023

(54) METHOD FOR MOBILE SERVICE CHAINING VIA HYBRID NETWORK RESOURCES SWITCHING

(71) Applicant: AT&T Intellectual Property I, L.P., Atlanta, GA (US)

(72) Inventors: Rajendra Prasad Kodaypak, Redmond, WA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 224 days.

(21) Appl. No.: 16/893,977

(22) Filed: Jun. 5, 2020

(65) Prior Publication Data
US 2020/0305206 A1 Sep. 24, 2020

Related U.S. Application Data

(63) Continuation of application No. 15/383,719, filed on Dec. 19, 2016, now Pat. No. 10,716,150.

(51) Int. Cl.
| | | |
|---|---|---|
| *H04W 76/10* | (2018.01) | |
| *H04W 24/08* | (2009.01) | |
| *H04W 28/16* | (2009.01) | |

(52) U.S. Cl.
CPC .......... *H04W 76/10* (2018.02); *H04W 24/08* (2013.01); *H04W 28/16* (2013.01)

(58) Field of Classification Search
None
See application file for complete search history.

(56) References Cited

U.S. PATENT DOCUMENTS

| | | | |
|---|---|---|---|
| 8,175,603 B1 * | 5/2012 | Hoole | H04W 36/38 |
| | | | 370/328 |
| 9,430,262 B1 | 8/2016 | Felstaine et al. | |
| 9,436,443 B2 | 9/2016 | Chiosi et al. | |
| 2014/0204828 A1 * | 7/2014 | Connors | H04W 48/10 |
| | | | 370/312 |

(Continued)

OTHER PUBLICATIONS

Mechtri et al.; "A Scalable Algorithm for the Placement of Service Function Chains"; IEEE Transactions on Network and Service Management; 2016; 15 pages.

*Primary Examiner* — Adnan Baig
(74) *Attorney, Agent, or Firm* — Guntin & Gust, PLC; Kenneth Kwan

(57) ABSTRACT

A method includes receiving a request for a communication session from a user device, identifying a first resource from a plurality of resources, wherein the first resource is associated with a first service control layer for a radio access network and wherein the plurality of resources includes at least one virtual network function (VNF), identifying a second resource from the plurality of resources, wherein the second resource is associated with a second service control layer for LTE core functions, identifying a third resource from the plurality of resources, wherein the third resource is associated with a third service control layer for content delivery, allocating a virtual machine to be used to instantiate the at least one VNF, instantiating the at least one VNF and establishing the communication session by facilitating communications between the first service control layer, the second service control layer and the third service control layer.

20 Claims, 14 Drawing Sheets

(56) References Cited

U.S. PATENT DOCUMENTS

| | | |
|---|---|---|
| 2014/0317261 A1 | 10/2014 | Shatzkamer et al. |
| 2015/0026334 A1* | 1/2015 | Choi ........................ H04L 47/38 |
| | | 709/224 |
| 2015/0063166 A1 | 3/2015 | Sif et al. |
| 2015/0358850 A1 | 12/2015 | La Roche, Jr. et al. |
| 2015/0382263 A1 | 12/2015 | Jain et al. |
| 2016/0057075 A1 | 2/2016 | Parikh et al. |
| 2016/0057209 A1 | 2/2016 | Parikh et al. |
| 2016/0085576 A1 | 3/2016 | Chastain et al. |
| 2016/0150076 A1 | 5/2016 | Foladare et al. |
| 2016/0205005 A1 | 7/2016 | Lee |
| 2016/0212017 A1 | 7/2016 | Li et al. |
| 2016/0248860 A1 | 8/2016 | Dunbar et al. |
| 2016/0269925 A1 | 9/2016 | Chou et al. |
| 2016/0353268 A1* | 12/2016 | Senarath ................ H04L 47/805 |
| 2017/0055276 A1 | 2/2017 | Callard et al. |
| 2017/0181021 A1* | 6/2017 | Yoon ..................... H04W 24/08 |
| 2017/0237686 A1* | 8/2017 | Wang ...................... H04L 67/63 |
| | | 709/219 |
| 2018/0070262 A1 | 3/2018 | Nakano et al. |
| 2018/0139109 A1 | 5/2018 | Zuerner |

* cited by examiner

METHOD FOR MOBILE SERVICE CHAINING VIA HYBRID NETWORK RESOURCES SWITCHING

CROSS REFERENCE TO RELATED APPLICATIONS

This application is a continuation of, and claims priority to, U.S. patent application Ser. No. 15/383,719, filed Dec. 19, 2016, entitled "Method For Mobile Service Chaining Via Hybrid Network Resources Switching," the entire contents of which are hereby incorporated herein by reference.

TECHNICAL FIELD

This disclosure relates generally to network management and, more specifically, to assigning and configuring general purpose hardware to support virtual network functions.

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on the general purpose hardware. Each VNF may require one or more virtual machines (VMs) to be instantiated. In turn, VMs may require various resources, such as memory, virtual computer processing units (vCPUs), and network interfaces or network interface cards (NICs). Determining how to assign these resources among VMs in an efficient manner may be unbearably complex.

This disclosure is directed to solving one or more of the problems in the existing technology. A service chain in LTE/LTE-A networks may involve a combination of hybrid physical network functions (PNF)/VNF based network application functions that are interconnected together via multiple control plane interfaces to form a service based session construct prior to delivering service specific user data. The hybrid PNF/VNF network functions and their distinctive network management systems, as well as their deployment in a vertically pooled resource configuration, presents a complex network architecture that needs to be managed effectively.

SUMMARY

The present disclosure includes a method including receiving a request for a communication session from a user device, identifying a first resource from a plurality of first resources, wherein the first resource is associated with a first service control layer for a radio access network and wherein the plurality of resources includes at least one virtual network function (VNF), identifying a second resource from the plurality of second resources, wherein the second resource is associated with a second service control layer for LTE core functions, identifying a third resource from the plurality of third resources, wherein the third resource is associated with a third service control layer for content, allocating a virtual machine to be used to instantiate the at least one VNF, instantiating the at least one VNF, establishing the communication session using the first resource, the second resource and the third resource by facilitating communications between the first service control layer, the second service control layer and the third service control layer. The method may further wherein the plurality of second resources comprises a combination of virtual network functions and physical network functions chained together in communication with each other. The method may further include wherein the second service control layer for LTE core functions allocates the plurality of second resources to provide LTE services and may further include tracking a performance metric for the communication and adjusting the plurality of second resources to provide LTE services.

In an aspect, the method may further include Identifying virtual machines (VMs) to be used to instantiate the at least one VNF, identifying hardware resources to be consumed by the VMs, determining a session capacity for a hardware platform based on the hardware resources and performance requirements, and assigning the hardware resources of the hardware platform to at least one of the VMs. The hardware resources may include a virtual computer processing unit (vCPU), a network interface card (NIC), and computer memory. In an aspect, the performance requirements may change during the communication session and the determining step may include determining a second session capacity for the hardware platform and the assigning step may include dynamically adjusting the hardware resources assigned to support the second session capacity.

In an aspect, the receiving step comprises receiving the request for a communication session from an application service layer and the request for a communication includes performance metrics for the communication. The method may further include tracking a performance of the communication and dynamically adjusting a capacity of the second resource based on the tracking step The disclosure is also directed to a system including an access network having a first service control layer associated therewith, a combination of virtual network resources and physical network resources, wherein the virtual network resources and physical network resources are communicatively chained to provide a dynamically configurable set of resources and wherein the combination matrix has a second service control layer associated therewith, a content network having a third service control layer associated therewith; and a master service orchestration layer in communication with the first service control layer, the second service control layer and the third service control layer, the service orchestration layer having a processor and a memory comprising executable instructions, wherein the executable instructions cause the processor to effectuate operations, the operations including receiving a request for a communication session, receiving a set of performance metrics for the communication session, sending to the first service control layer a request to allocate network access resources to support the communication session, sending to the second service control layer a request to allocate virtual network resources or physical network resources to support the communication session, sending to the third service control layer a request to aggregate content to be provided during the communication session and monitoring the communication session.

In an aspect the operations may further include sending a request to the first service control layer to dynamically adjust the allocation of network access resources based on the monitoring step. The method may further include sending a request to the second service control layer to dynamically adjust the allocation of virtual network functions or physical network functions based on the monitoring step.

In an aspect, the service orchestration layer is in communications with an application service layer and wherein the request for a communication session and the set of performance metrics is received from the application service layer. The request for communication is request for one of a broadcast, multicast and unicast communication. In an aspect wherein the communication is a broadcast communication, the allocated network resources, the allocated virtual network functions and physical network functions support multiple user equipment participating in the communication session. The performance metrics may include end user quality of service and network throughput associated with the communication session. The operations further include coordinating dynamically reallocation of resources during the communication session. The operations may further include receiving from the third service control layer additional content generated during the communication session and sending a second request to the second control layer to dynamically reallocate resources to support the communication session.

In an aspect, the operations may further include maintaining a mapping table of connected user equipment and contexts associated with the communication session. The operations further include providing coordination between the first service control layer, the second service control layer and the third service control layer during the communication session.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

This disclosure is directed to the efficient management of a hybrid PNF/VNF network in a vertically pooled resource configuration. Dynamic switching of these network functions across hybrid PNF/VNF resource pools is disclosed to maintain session constructs and for efficient services delivery. The digital mobile service and media experience in such a hybrid environment is influenced by various factors including content computing infrastructure (creation, aggregation and distribution), network infrastructure (data transport, connectivity, end user service delivery options) and digital experience (use of smartphones, PDAs, digital home equipment, mobility, convergence etc.).

Figure 1A:
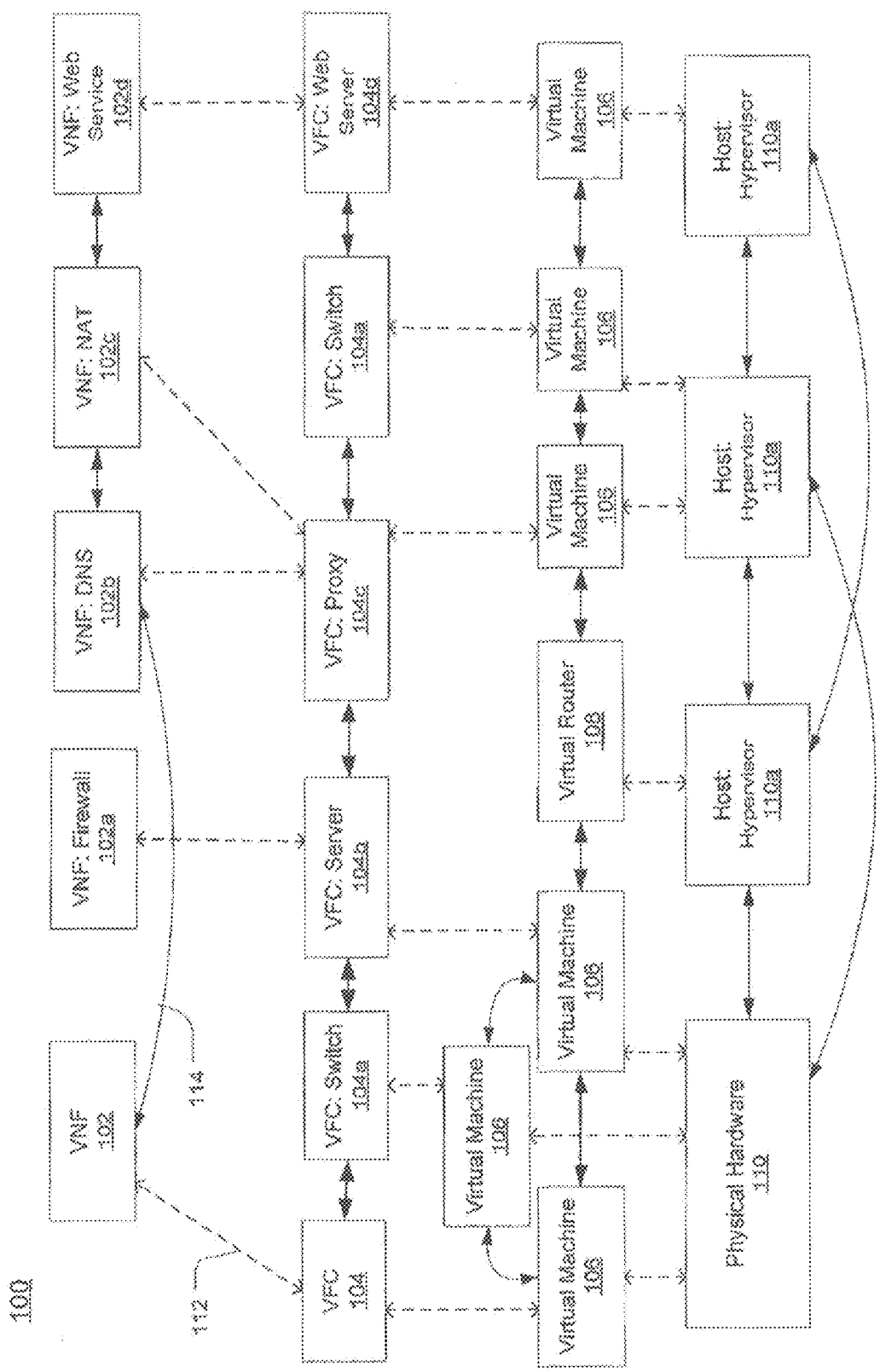
FIG. 1a is a representation of an exemplary network.

The disclosure includes an intelligent tiered service orchestration layer for such a massive cloud centric network infrastructure with hybrid PNF/VNF components across multiple networking domains. The tiered orchestration layer works vertically across the network infrastructure chain (PNF/VNF) and horizontally across the networking/applications domain within an end to end service delivery path can help in designing and developing an end-to-end service chain that is effective for tracking user level services consumption, preferences and use such information via integrated closed loop monitoring method within the service layer to personalize the end users mobile services experience. Such an approach could lead to targeted new revenue generation, management and dynamic pricing for digital mobile services. This disclosure provides a method to provide such a service layer orchestrator that can work both vertically and horizontally across the VNFs, service domains, chaining them for a given service type, monitoring the status and utilize the pooled VNF resources effectively to deliver a robust service to end user FIG. 1a is a representation of an exemplary network 100. Network 100 may comprise an SDN that is, network 100 may include one or more virtualized functions implemented on general purpose hardware, such as in lieu of having dedicated hardware for every network function. That is, general purpose hardware of network 100 may be configured to run virtual network elements to support communication services, such as mobility services, including consumer services and enterprise services. These services may be provided or measured in sessions.

A virtual network functions (VNFs) 102 may be able to support a limited number of sessions. Each VNF 102 may have a VNF type that indicates its functionality or role. For example, FIG. 1a illustrates a gateway \INF 102a and a policy and charging rules function (PCRF) VNF 102b. Additionally or alternatively, VNFs 102 may include other types of VNFs. Each VNF 102 may use one or more virtual machines (VMs) 104 to operate. Each VM 104 may have a VM type that indicates its functionality or role. For example, FIG. 1a illustrates a MCM VM 104a, an ASM VM 104h, and a DEP VM 104c. Additionally or alternatively, VMs 104 may include other types of VMs. Each VM 104 may consume various network resources from a hardware platform 106, such as a resource 108, a virtual central processing unit (vCPU) 108a, memory 108b, or a network interface card (NIC) 108c. Additionally or alternatively, hardware platform 106 may include other types of resources 108.

Figure 1B:
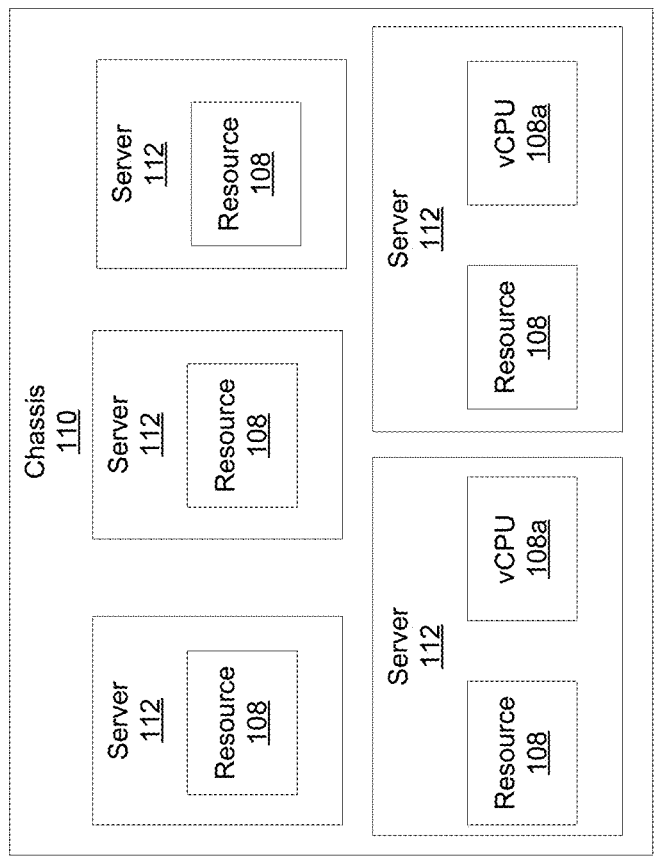
FIG. 1b is a representation of an exemplary hardware platform for a network.

While FIG. 1a illustrates resources 108 as collectively contained in hardware platform 106, the configuration of hardware platform 106 may isolate, for example, certain memory 108c from other memory 108c. FIG. 1b provides an exemplary implementation of hardware platform 106 which will be discussed in more detail below.

With respect to FIG. 2, there is shown a hybrid network system 200 having both VNFs and physical hardware functions PNFs which may, for example, include hardware and software from a plurality of vendors. There is shown a box 220 representing hardware platform(s) 106, which may, for example, include one or more hardware platforms. The hardware platforms 106 may be generic hardware servers capable of being configured using software to provide processing for one or more VNFs. As such, one or more VNFs may be instantiated on one or more hardware platform(s) 106 dynamically as needed for supplying network functionality for communications involving user elements 211.

The hardware platform(s) 106 may be in communication with virtual switches 218 which in turn are in communication with a pool of VMs 214, which, as shown in this example, include VM1 214a, VM2 214b, and VMn 214 n where n can represent any number of virtual machines. The virtual switches 218 assist in the mapping of one or more entities in the pool of VMs 214 to the hardware platform(s) 106 that are represented by box 220. For example, an MME function may be instantiated as a VNF on both VM1 214a and VM2 214b and therefore require switching capability during a communication session. Using virtual switches 218 for this functionality may provide more flexibility in dynamically configuring the VNFs used to support the various communication sessions.

Also shown is a radio access network (RAN) function 212 which may, for example, comprise RAN hardware from one or more vendors. The RAN function 212 is in communication with the RAN service control lawyer 206 which may, for example, include the setup and allocation of RAN resources for a particular LTE communication requested by user equipment 211. While FIG. 2 shows a RAN network function 212, the network may be any type of access network, including but not limited to 5G, Wi-Fi, Bluetooth, WAN, LAN, or any other type of network. The term access network function and RAN network function as used herein are interchangeable.

There is also shown a content network 216 which may, for example, include the functions to create, aggregate, and distribute content for a communication requested by LIE 211. The RAN function 212 is in communication with the content network 216 through the pool of virtual machines 214 as indicated by a series of arrow(s) 213. The series of arrows 213 are shown passing through the pool of VMs 214 to indicate that the network functionality to support the communication session, including by not limited to MME, HSS, gateways, and other network functionality is provided by one or more hardware or software defined network elements.

There is also shown a series of service control layers. There is a network access service control layer 206 associated with the access network function 212. The network access control layer 206 may be a middleware layer that provides secure access to the RAN function 212, including, but not limited to, configuring RAN resources to enable the LTE bearer and service establishment in a LTE, context. The network access service control layer 206 may control both the physical network access resources as well as SDN controlled access network resources and provides the vertical chaining of resources to establish a UE context for the provision of services.

Another control layer is the LTE core service control layer 208. This LTE core service control layer 208 provides instantiation, access and control to the various virtual functions running on virtual machines VM1 214a through VMn 214n. There may also be physical network functions (PNFs) under the control of the LIE core service control layer. As such, the LTE core service control layer is configured to manage a hybrid matrix of VNFs and PNFs comprising the LTE core network functionality. Finally, there is a content service control layer 210 which provides APIs to access the content network 216. Each of the LTE core service control layer 208 and the content service control layer 210 provides the vertical chaining of resources associated therewith.

In order to control the horizontal chaining of resources, there is shown a master service orchestrator layer 202. The master service orchestrator layer 202 coordinates resource allocation and management across disparate access network and LTE core network functions. This provides dynamic and agile in-field end to end services testing utilizing hybrid network functions.

The master service orchestrator layer 202 also allows for quick turn-around times for completion of new services by providing an access point to UE 211. The master service orchestrator layer 202 may interwork directly with UE 211, via integrated software agents where necessary, on demand for a given application or service to extract certain critical performance metrics that may be used in the cross-layer correlation with the access network control layer 206 and the content service control layer 210 for customization or personalization based on network and user dynamics when interacting with the customers' UE 211 for a given mobile service that was chained in a certain manner.

With reference to FIG. 2h, there is shown a functional matrix 314 of hybrid VNFs and PNFs that comprise the LTE core functions. For example, MME pools 320 comprising VNFs and PNFs from multiple vendors A and B may be included. Likewise, HSS pools 322 comprising VNFs and PNFs from multiple vendors A and B may be included. S/PGW pools 324 comprising VNFs and PNFs from multiple vendors A and B may be included. MGW pools 326 comprising VNFs and PNFs from multiple vendors A and B may be included. Finally, broadcast/multicast service center (BMSC) pools 328 comprising VNFs and PNFs from multiple vendors A and B may be included. Note that these LTE core functions represented in FIG. 2b are exemplary and non-limiting and other LIE core network functions, either virtual or physical, are included within the scope of the present disclosure.

The master service orchestrator layer 202 may also provide instructions and feedback to the LTE core service control layer 208 to enable the dynamic instantiation of the functional matrix 314 of VNF/PNF LTE core elements. Based on feedback from the master service orchestrator layer 202, the LTE core service control layer 208 may dynamically instantiate a number of \TNF elements such as encoders of a given type, perform rate adaptation to meet a given service profile, invoke compression or acceleration schemes, or any other adaptations for faster packet processing in the network or to meet other class of service requirements. As shown in FIG. 2h, the functional matrix 314 may be dynamically modified to change the boundaries between physical and virtual network elements. The LTE core service control layer 208 maintains the state tables required to synchronize the UE mobility context and bearer management across the functional matrix 314 for any particular communication session or sessions.

The master service orchestrator layer 202 also interfaces with the application service layer 201 on a per service chain or application basis and extracts the relevant network requirements as well as the application service layer 201 performance metrics that are important to cross-layer correlation at the master service orchestrator layer 202. The application service layer 201 may provide the master service orchestrator layer 202 with source content metrics used a baseline reference for certain applications for proactive evaluation and event handling.

The application service layer 201 may also interact directly with UE 211 to develop performance metrics that may be used on the cross-layer correlation through the master service orchestration layer 202 with the access network layer 206, the content layer 210 and the LTE core service layer 208. This permits the customization or personalization based on network and user dynamics when interacting with a customer for any given mobile service.

Figure 2A:
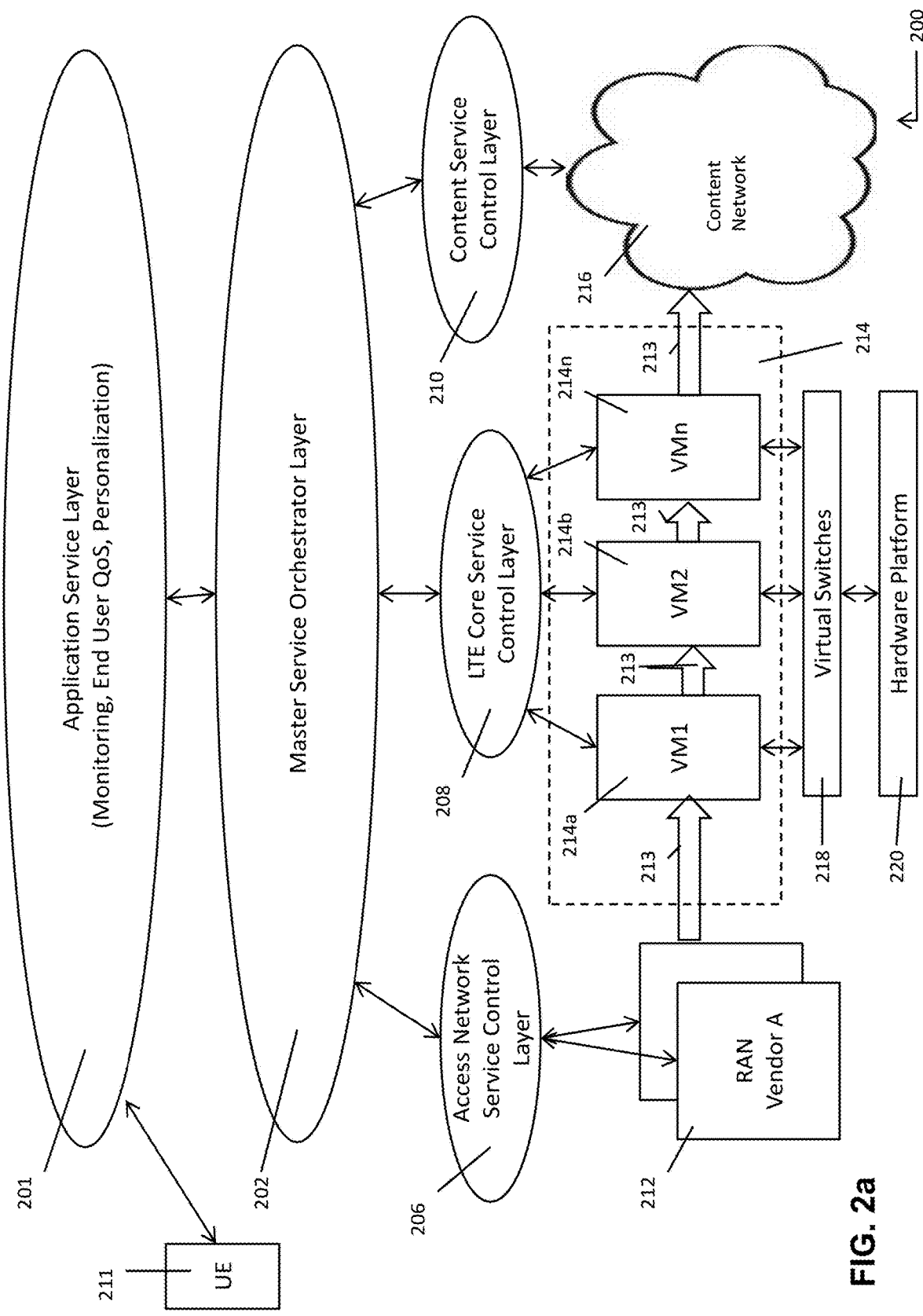
FIG. 2a is a representation of an exemplary embodiment in accordance with the present disclosure.
Figure 2B:
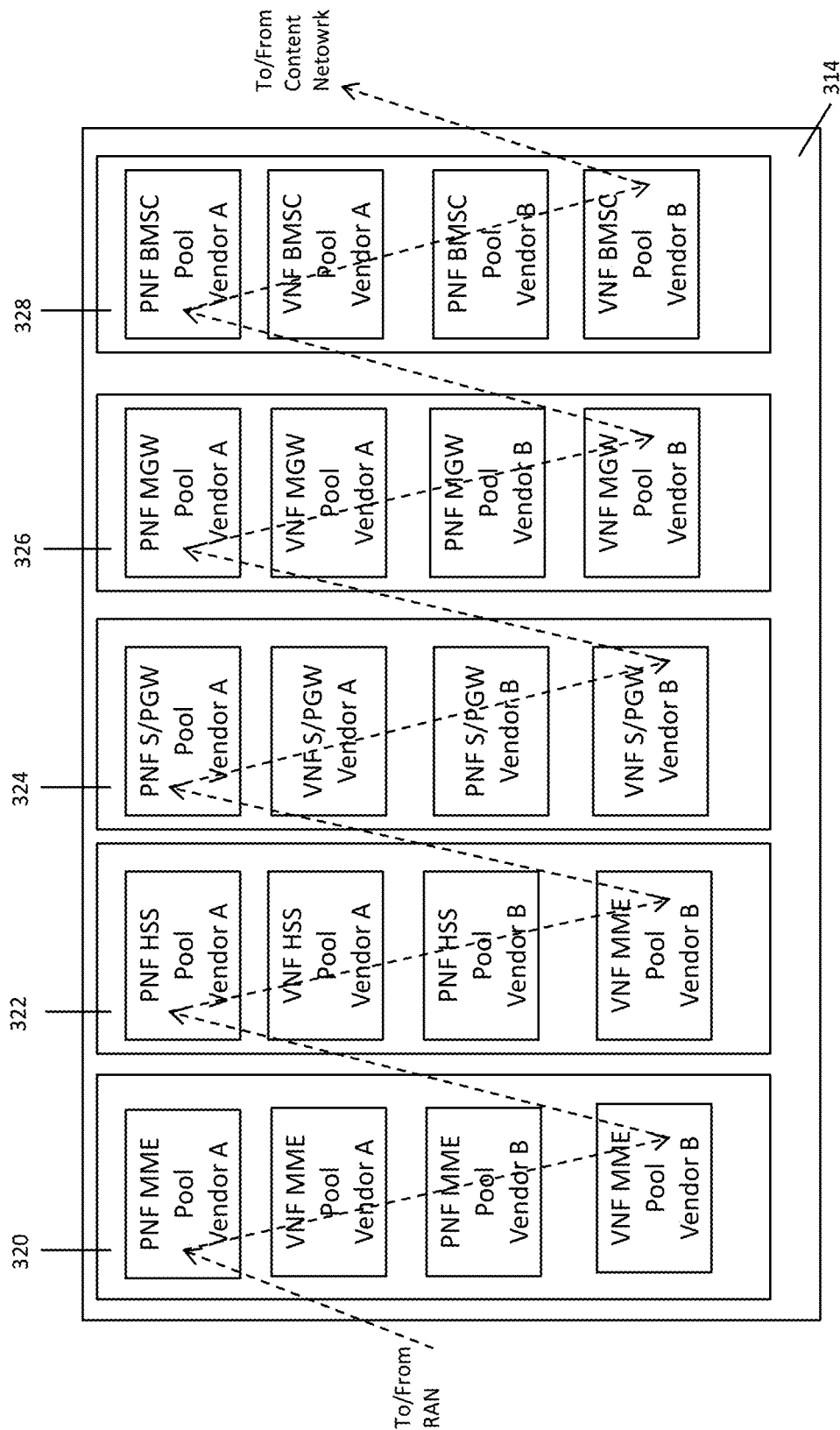
FIG. 2b is a representation of an exemplary embodiment illustrating the chaining of VNF in accordance with the present disclosure.

Additionally, the architecture shown in FIGS. 2a and 2b permit the dynamic and agile in-field end-to-end services testing utilizing the hybrid physical/virtual network functions that demand quick turnaround for completion. This is useful for preparation and launch of commercial services, including applications relating to the machine to machine communications, the Internet of Things (IoT), services provided by multiple providers, device and network state determination and other applications.

Figure 3A:
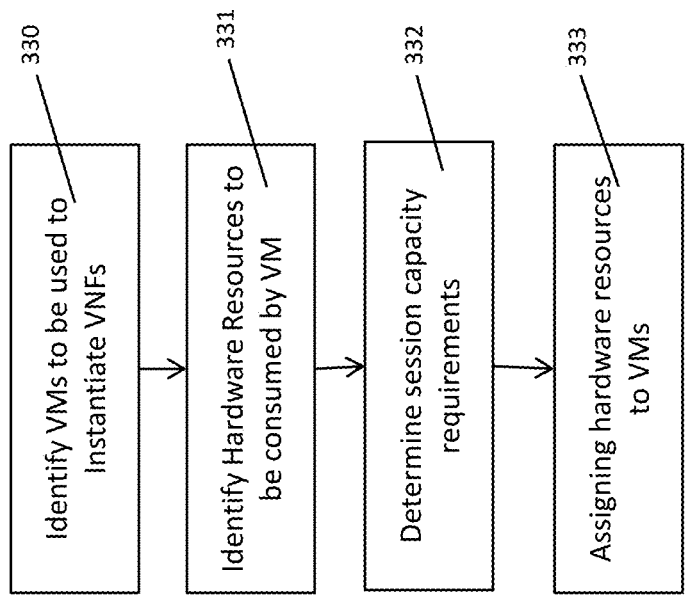
FIG. 3a is an exemplary flow diagram showing the allocation of hardware resources to support virtual machines in accordance with the present invention.
Figure 3B:
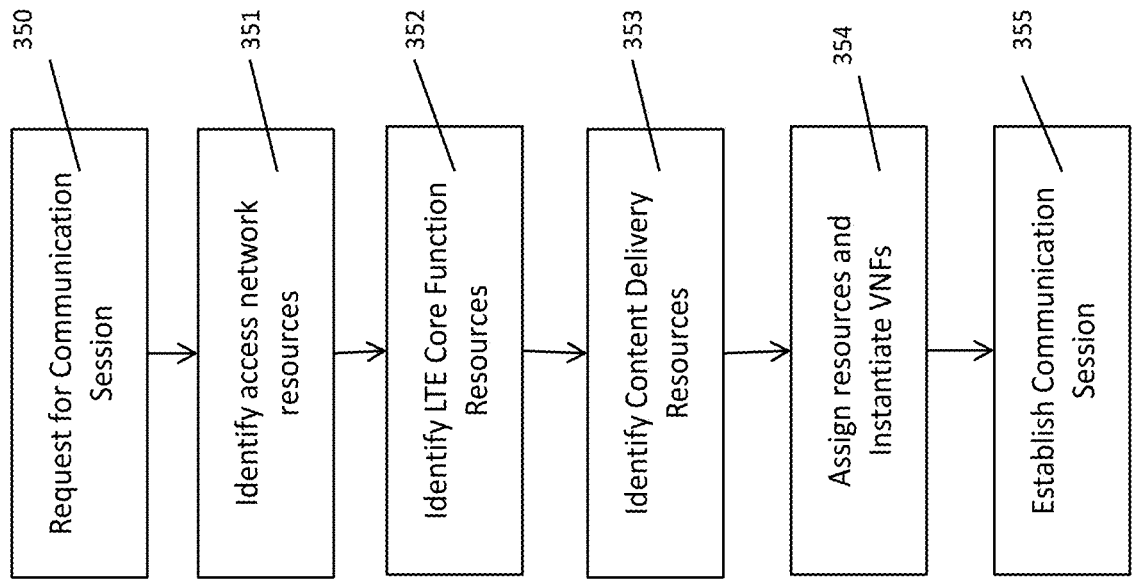
FIG. 3b is an exemplary flow diagram showing the allocation of resources in accordance with the present disclosure.

FIG. 3a shows an exemplary flow chart of how the virtual network elements identified in FIG. 2b may be assigned. At 330, the VMs to be used to instantiate VNFs are identified. At 331, the hardware resources to be consumed by the VMs are identified. At 332, the session requirements are identified. Finally, at 333, the hardware resources are assigned to the VMs.

Use Cases. The tiered master service orchestrator 202 at the network control layer works across the horizontal and vertical resource pools in an end-to-end call setup during critical resources allocation phase and chains an end user or group of users for proper session/associated bearer establishments associated with any cast mobility service, including, for example, unicast, broadcast and multicast services.

As an example for the broadcast service scenario, the content network 216 has its own content service control layer 210 for the creation, aggregation and distribution of content. A user through the UE 211 may have previously established a request a particular type of broadcast service to be provided by the content network 216. As part of the start of the broadcast, there is a request passed through either the application service lawyer 201 or directly to the master service orchestrator 202. In either case, the request for service is passed to the master service orchestrator layer 202 which then may interwork with the LIE core service control layer 208 and the access network service control layer 206 to determine the specific content type, audio/video encoding and/or compression schemes, algorithms and acceleration mechanisms that may be needed for preparing the content format to be delivered via broadcast to the end users based on available network capacity, user demand, service offering, subscription and geographic location needs. Based on the feedback received from service orchestrator, the VNF service control layer 208 can dynamically instantiate the required type and number of PNF/VNF elements 320, 322, 324, 326, 328 such as encoders of a given type, perform rate adaptation to meet a given service profile or class of service and/or invoke compression/acceleration schemes for faster packet processing in the network. The master services orchestration layer 201 and the application service layer 202 may work in tandem on a per service chain or per application basis to extracts the relevant network requirements and assign and/or instantiate the PNF/sVNFs to support the communication request. The application service layer 201 provides the master service orchestrator layer 202 with source content metrics that are used as a baseline reference for certain applications for proactive evaluation and event handling for customization.

A similar process occurs in the case in which a UE 211 initiates a request for service which may, for example, include a request for content. With reference to FIG. 3a, there is shown an exemplary method for providing a service requested by a UE 211. At 350, there is a request from the UE 211 to establish a communication session. That request may be sent to the application service layer 201 or directly to the master service orchestrator layer 202. At 351, the access network resources are determined. As set forth earlier, access network resources may include RAN resources from one or more vendors as well as other resources for other access network types including, for example, Wi-Fi or Bluetooth. These network resources may be determined in communication with the access network services control layer 206. At 352, the LTE core resources are determined. The LTE core resources may be a hybrid of PNFs/VNFs to provide the core resources for processing the communication and may, for example, be determined by the LTE core service control layer 208. At 353, the content delivery resources are identified. These resources are based on specific content requested by the UE 211 or, in the case of broadcast, by the content requested to be broadcast to a plurality of UEs 211. The content resources may be determined by the content service control layer 210. At each of steps 351, 352 and 353, the application service layer 201, which monitors the end user experience, including any personalization, QoS considerations or any other aspects of the user experience, in conjunction with the master service orchestrator layer 202, which monitors the use of all access network, LTE core functions, and content determines the requirements for the communication and communicates with the lower service control layers to allocate the resources identified. At 354, the identified resources are assigned and VNFs, if any, are instantiated. At 355, the communication is established.

For any particular communication, for example, a communication associated with IoT, the resources required for the delivery of the communication services may change over time. As such, the master service level orchestrator 202, which is monitoring the state of the chained resources both vertically and horizontally, is able to dynamically control the allocation/deallocation of the resources used for the communication.

Figure 3C:
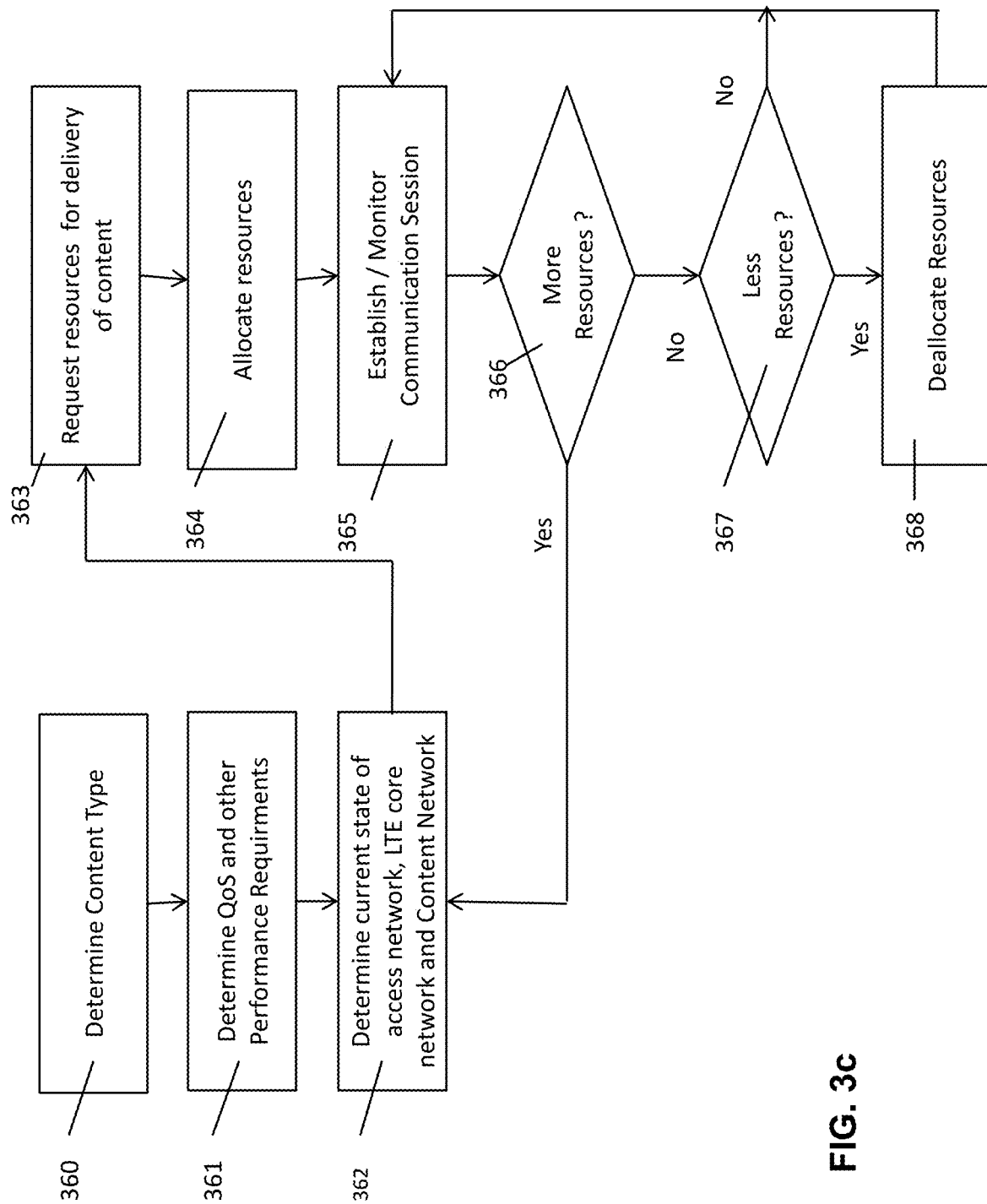
FIG. 3c is an exemplary flow diagram showing the dynamic allocation of resources in accordance with the present disclosure.

Another example of a process flow is shown in FIG. 3c in which content is to be delivered to a user or multiple users. At 360, the content type is determined, which may, for example be content that can be monetized for particular applications. At 361, the QoS and other performance requirements may be determined by the application service control layer 201 and passed to the master services orchestration layer 202. At 362. The current state of network resources, including access network resources, LTE core network resources and content network resources which are monitored by the master services orchestration layer 202, are determined. At 363, a request for additional resources for delivery of the content is requested by the master service orchestration layer to each of the access network service control layer 206, the LTE core service control layer 208 and the content service control layer 210 as may be needed. At 364, the requested resources are allocated and at 365 the communication is established and monitored. At 366, a decision is made as to whether more resources are needed to meet performance metrics, if yes, the process returns to 362 to start the process of dynamically allocating more resources. If no more resources are needed at 366, the decision as to whether less resources are needed to continue to meet the performance metrics. If yes, resources are deallocated at 368. If no more resources are needed or if resources are deallocated, then the process returns to 365 to continue to monitor the communication session to enable the allocation of resources acceptable to meet the performance metrics.

It should be understood that these process flows are exemplary only and are not intended to limit the disclosure or the scope of the appended claims in any way.

By tracking the hybrid PNF/VNF network resources, their connectivity mappings between the mobility access and core network elements as well as between the mobility core and content delivery network functions in a service chain that are pooled in a matrix configuration, the two tiers layered orchestrators comprising the application service layer 201 and the master service level orchestrator 202 can determine the best possible means of sharing such resource pools for the specific mobile service chain based on the aggregate services offering, network conditions, health of the service chain and end users' service commitments and needs. In such a mobile service chained environment that uses a structured and tiered orchestrator, customer experience and service personalization could be significantly improved.

To complete the description of the operating environment, with respect to FIG. 1b, there is shown a hardware platform 106 comprising one or more chasses 110. Chassis 110 may refer to the physical housing or platform for multiple servers or other network equipment. In an aspect, chassis 110 may also refer to the underlying network equipment. Chassis 110 may include one or more servers 112. Server 112 may comprise general purpose computer hardware or a computer. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together (not shown) in any combination or arrangement. For example, all servers 112 within a given chassis 110 may be communicatively coupled. As another example, servers 112 in different chasses 110 may be communicatively coupled. Additionally or alternatively, chasses 110 may be communicatively coupled together (not shown) in any combination or arrangement.

The characteristics of each chassis 110 and each server 112 may differ. For example, FIG. 1b illustrates that the number of servers 112 within two chasses 110 may vary. Additionally or alternatively, the type or number of resources 110 within each server 112 may vary. In an aspect, chassis 110 may be used to group servers 112 with the same resource characteristics. In another aspect, servers 112 within the same chassis 110 may have different resource characteristics.

Given hardware platform 106, the number of sessions that may be instantiated may vary depending upon how efficiently resources 108 are assigned to different VMs 104. For example, assignment of VMs 104 to particular resources 108 may be constrained by one or more rules. For example, a first rule may require that resources 108 assigned to a particular VM 104 be on the same server 112 or set of servers 112. For example, if VM 104 uses eight vCPU's 108a, 1 GB of memory 108b, and 2 NICs 108c, the rules may require that all of these resources 108 be sourced from the same server 112. Additionally or alternatively, VM 104 may require splitting resources 108 among multiple servers 112, but such splitting may need to conform with certain restrictions. For example, resources 108 for VM 104 may be able to be split between two servers 112. Default rules may apply. For example, a default rule may require that all resources 108 for a given VM 104 must come from the same server 112.

An affinity rule may restrict assignment of resources 108 for a particular VM 104 (or a particular type of VM 104). For example, an affinity rule may require that certain VMs 104 be instantiated on (that is, consume resources from) the same server 112 or chassis 110. For example, if VNF 102 uses six MCM VMs 104a, an affinity rule may dictate that those six MCM VMs 104a be instantiated on the same server 112 (or chassis 110). As another example, if VNF 102 uses MCM VMs 104a, ASM VMs 104b, and a third type of VMs 104, an affinity rule may dictate that at least the MCM VMs 104a and the ASM VMs 104b be instantiated on the same server 112. (or chassis 110). Affinity rules may restrict assignment of resources 108 based on the identity or type of resource 108, VNF 102, VM 104, chassis 110, server 112, or any combination thereof.

An anti-affinity rule may restrict assignment of resources 108 for a particular VM 104 (or a particular type of VM 104). In contrast to an affinity rule—which may require that certain VMs 104 be instantiated on the same server 112 or chassis 110—an anti-affinity rule requires that certain VMs 104 be instantiated on different servers 112 (or different chasses 110). For example, an anti-affinity rule may require that MCM VM 104a be instantiated on a particular server 112 that does not contain any ASM VMs 104b. As another example, an anti-affinity rule may require that MCM VMs 104a for a first VNF 102 be instantiated on a different server 112 (or chassis 110) than MCM VMs 104a for a second VNF 102. Anti-affinity rules may restrict assignment of resources 108 based on the identity or type of resource 108, VNF 102, VM 104, chassis 110, server 112, or any combination thereof.

Within these constraints, resources 108 of hardware platform 106 may be assigned to be used to instantiate VMs 104, which in turn may be used to instantiate VNFs 102, which in turn may be used to establish sessions. The different combinations for how such resources 108 may be assigned may vary in complexity and efficiency. For example, different assignments may have different limits of the number of sessions that can be established given a particular hardware platform 106.

For example, consider a session that may require gateway VNF 102a and PCRF VNF 102b. Gateway VNF 102a may require five VMs 104 instantiated on the same server 112, and PCRF VNF 102b may require two VMs 104 instantiated on the same server 112. (Assume, for this example, that no affinity or anti-affinity rules restrict whether VMs 104 for PCRF VNF 102b may or must be instantiated on the same or different server 112 than VMs 104 for gateway VNF 102a.) In this example, each of two servers 112 may have sufficient resources 108 to support 10 VMs 104. To implement sessions using these two servers 112, first server 112 may be instantiated with 10 VMs 104 to support two instantiations of gateway VNF 102a, and second server 112 may be instantiated with 9 VMs: five VMs 104 to support one instantiation of gateway VNF 102a and four VMs 104 to support two instantiations of PCRF VNF 102b. This may leave the remaining resources 108 that could have supported the tenth VM 104 on second server 112 unused (and unusable for an instantiation of either a gateway VNF 102a or a PCRF VNF 102b). Alternatively, first server 112 may be instantiated with 10 VMs 104 for two instantiations of gateway VNF 102a and second server 112 may be instantiated with 10 VMs 104 for five instantiations of PCRF VNF 102b, using all available resources 108 to maximize the number of VMs 104 instantiated.

Consider, further, how many sessions each gateway VNF 102a and each PCRF VNF 102b may support. This may factor into which assignment of resources 108 is more efficient. For example, consider if each gateway VNF 102a supports two million sessions, and if each PCRF VNF 102b supports three million sessions. For the first configuration—three total gateway VNFs 102a (which satisfy the gateway requirement for six million sessions) and two total PCRF VNFs 102b (which satisfy the PCRF requirement for six million sessions)—would support a total of six million sessions. For the second configuration—two total gateway VNFs 102a (which satisfy the gateway requirement for four million sessions) and five total PCRF VNFs 102b (which satisfy the PCRF requirement for 15 million sessions)—would support a total of four million sessions. Thus, while the first configuration may seem less efficient looking only at the number of available resources 108 used (as resources 108 for the tenth possible VM 104 are unused), the second configuration is actually more efficient from the perspective of being the configuration that can support more the greater number of sessions.

To solve the problem of determining a capacity (or, number of sessions) that can be supported by a given hardware platform 105, a given requirement for VNFs 102 to support a session, a capacity for the number of sessions each VNF 102 (e.g., of a certain type) can support, a given requirement for VMs 104 for each VNF 102 (e.g., of a certain type), a give requirement for resources 108 to support each VM 104 (e.g., of a certain type), rules dictating the assignment of resources 108 to one or more VMs 104 (e.g., affinity and anti-affinity rules), the chasses 110 and servers 112 of hardware platform 106, and the individual resources 108 of each chassis 110 or server 112 (e.g., of a certain type), an integer programming problem may be formulated.

First, a plurality of index sets may be established. For example, index set L may include the set of chasses 110. For example, if a system allows up to 6 chasses 110, this set may be:

$$L=(1,2,3,4,5,6),$$

where l is an element of L.

Another index set J may include the set of servers 112. For example, if a system allows up to 16 servers 112 per chassis 110, this set may be:

$$J=\{1,2,3,\ldots,16\},$$

where j is an element of J.

As another example, index set K having at least one element k may include the set of VNFs 102 that may be considered. For example, this index set may include all types of VNFs 102 that may be used to instantiate a service. For example, let $$K=\{GW, PCRF\}$$

where GW represents gateway VNFs 102a and PCRF represents PCRF VNFs 102b.

Another index set I(k) may equal the set of VMs 104 for a VNF 102 k. Thus, let $$I(GW)=(MCM, ASM, IOM, WSM, CCM, DCM)$$

represent VMs 104 for gateway VNF 102a, where MCM represents MCM VM 104a, ASM represents ASM VM 104b, and each of IOM, WSM, CCM, and DCM represents a respective type of VM 104. Further, let $$I(PCRF)=(DEP, DIR, POL, SES, MAN)$$

represent VMs 104 for PCRF VNF 102b, where DEP represents DEP VM 104c and each of DIR, POL, SES, and MAN represent a respective type of VM 104.

Another index set V may include the set of possible instances of a given VM 104. For example, if a system allows up to 20 instances of VMs 102, this set may be:

$$V=(1,2,3,\ldots,20),$$

where v is an element of V.

In addition to the sets, the integer programming problem may include additional data. The characteristics of VNFs 102, VMs 104, chasses 110, or servers 112 may be factored into the problem. This data may be referred to as parameters. For example, for given VNF 102 k, the number of sessions that VNF 102 k can support may be defined as a function S(k). In an aspect, for an element k of set K, this parameter may be represented by $S(k)>=0$; is a measurement of the number of sessions k can support. Returning to the earlier example where gateway VNF 102a may support 2 million sessions, then this parameter may be $$S(GW)=2,000,000.$$

VM 104 modularity may be another parameter in the integer programming problem. VM 104 modularity may represent the VM 104 requirement for a type of VNF 102. For example, for k that is an element of set K and i that is an element of set I, each instance of VNF k may require M(k, i) instances of VMs 104. For example, recall the example where $$I(GW)=(MCM, ASM, IOM, WSM, CCM, DCM).$$

In an example, M(GW, I(GW)) may be the set that indicates the number of each type of VM 104 that may be required to instantiate gateway VNF 102a. For example, $$M(GW, I(GW))=(2,16,4,4,2,4)$$

may indicate that one instantiation of gateway VNF 102a may require two instantiations of MCM VMs 104a, 16 instantiations of ACM VM 104b, four instantiations of IOM VM 104, four instantiations of WSM VM 104, two instantiations of CCM VM 104, and four instantiations of DCM VM 104.

Another parameter may indicate the capacity of hardware platform 106. For example, a parameter C may indicate the number of vCPUs 108a required for each VM 104 type i and for each VNF 102 type k. For example, this may include the parameter $$C(k,i).$$

For example, if MCM VM 104a for gateway VNF 102a requires 20 vCPUs 108a, this may be represented as $$C(GW, MCM)=20.$$

However, given the complexity of the integer programming problem—the numerous variables and restrictions that must be satisfied—implementing an algorithm that may be used to solve the integer programming problem efficiently, without sacrificing optimality, may be difficult.

Figure 4:
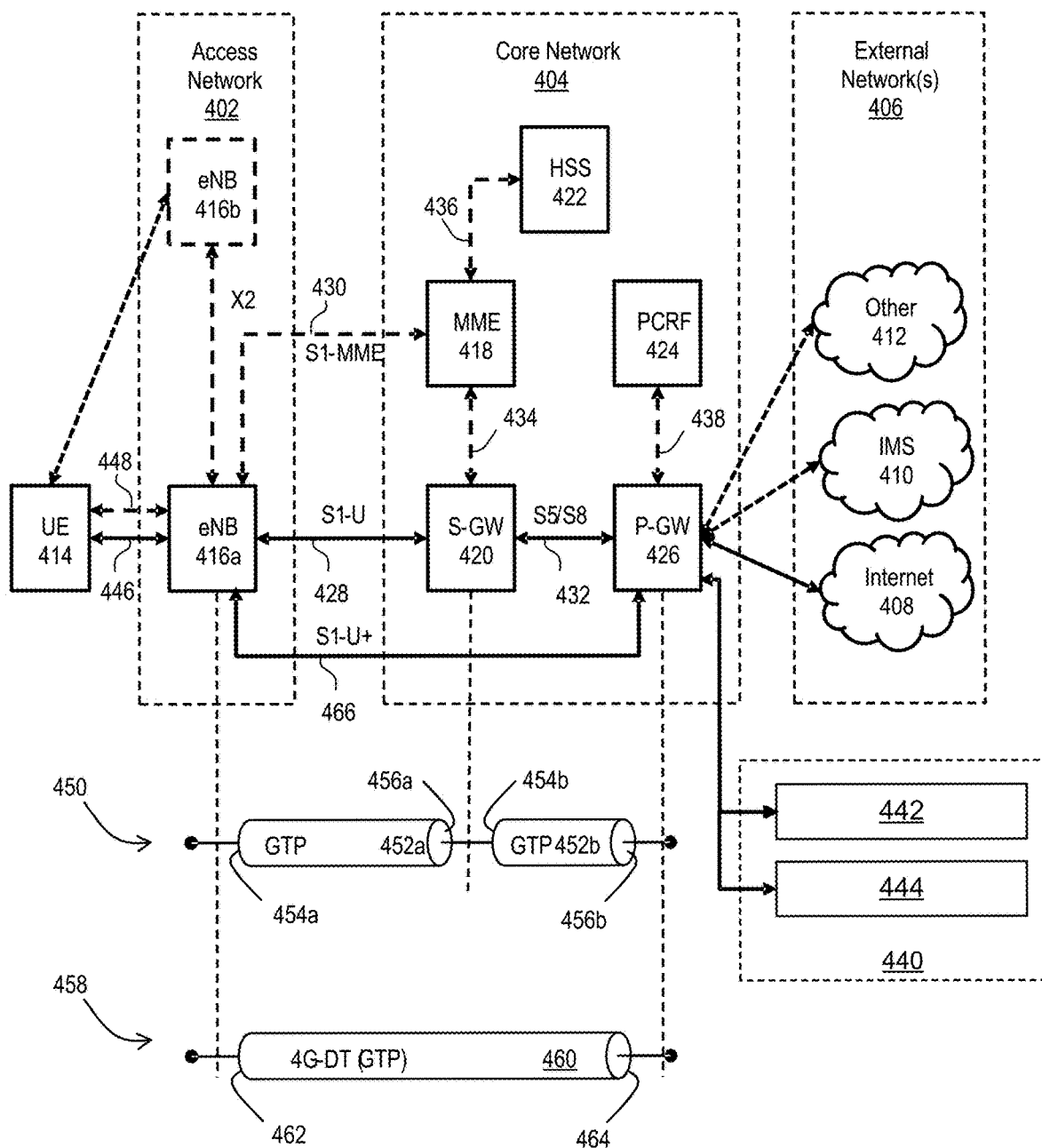
FIG. 4 depicts an exemplary communication system that provide wireless telecommunication services over wireless communication networks that may be at least partially implemented as an SDN.

FIG. 4 illustrates a functional block diagram depicting one example of an LTE-EPS network architecture 400 that may be at least partially implemented as an SDN. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a. SGW 420, PGW 426 and external network 406 may be considered to constitute data transferred according to an end-to-end IP service. However, for the present disclosure, to properly perform establishment management in LTE-EPS network architecture 40X), the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels. or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S I-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing. e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 1B:
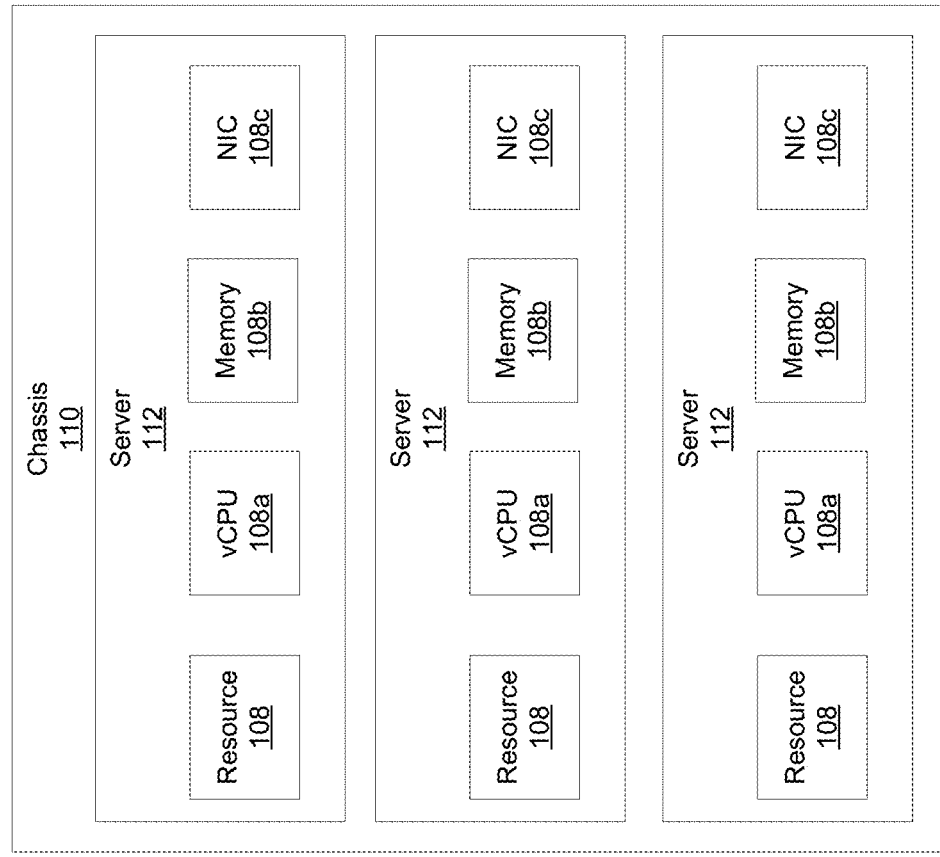
Figure 5:
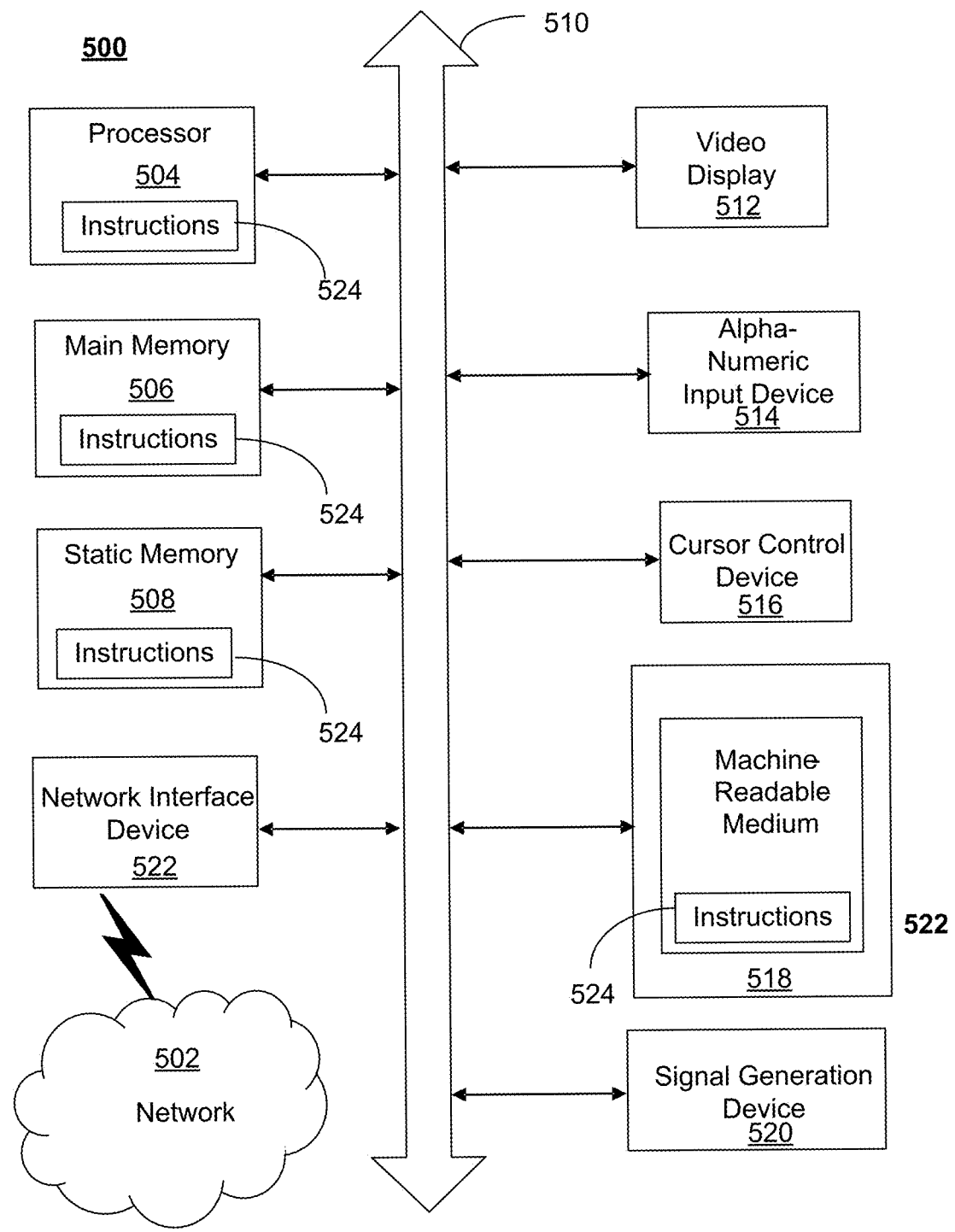
FIG. 5 depicts an exemplary diagrammatic representation of a machine in the form of a computer system.

FIG. 5 depicts an exemplary diagrammatic representation of a machine in the form of a computer system 500) within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
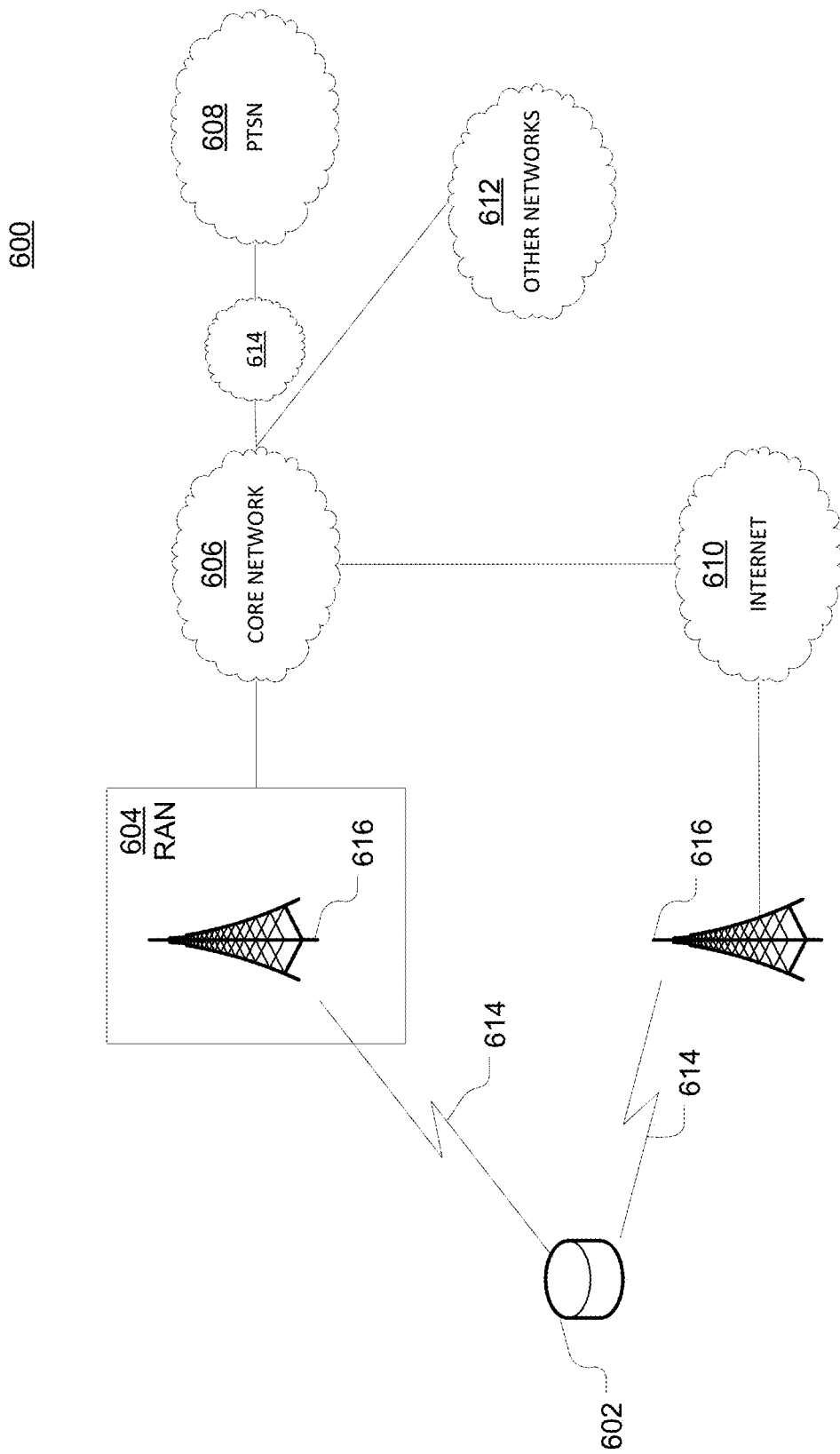
FIG. 6 is an exemplary diagrammatic representation of a cellular communications network.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606. PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE). GSM EDGE (GERAN), or the like.

Base station 616 may be a wireless router, Home Node B. Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA. CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling. Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608. Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
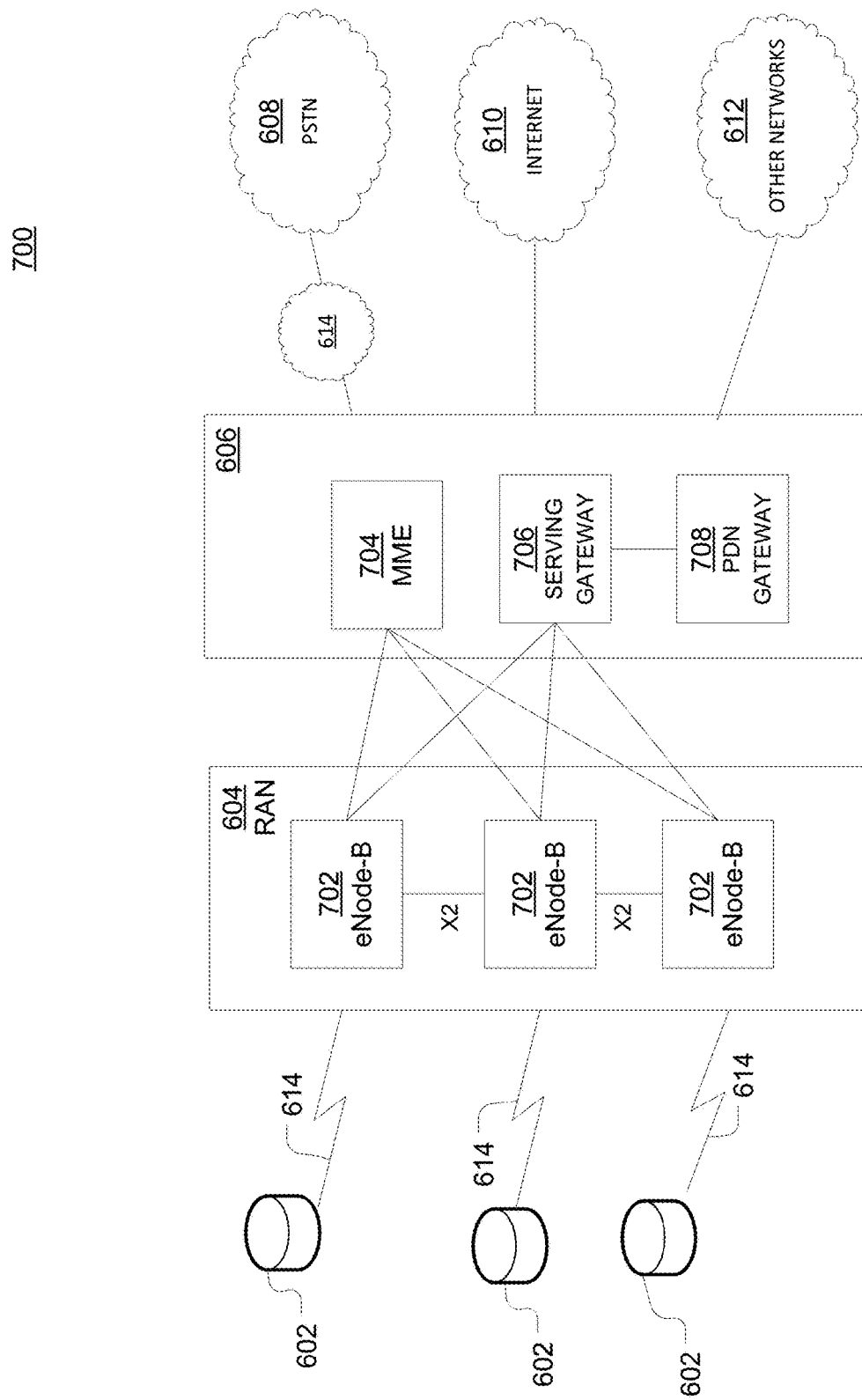
FIG. 7 is an example system including RAN and core network functions.

FIG. 7 is an example system 100 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
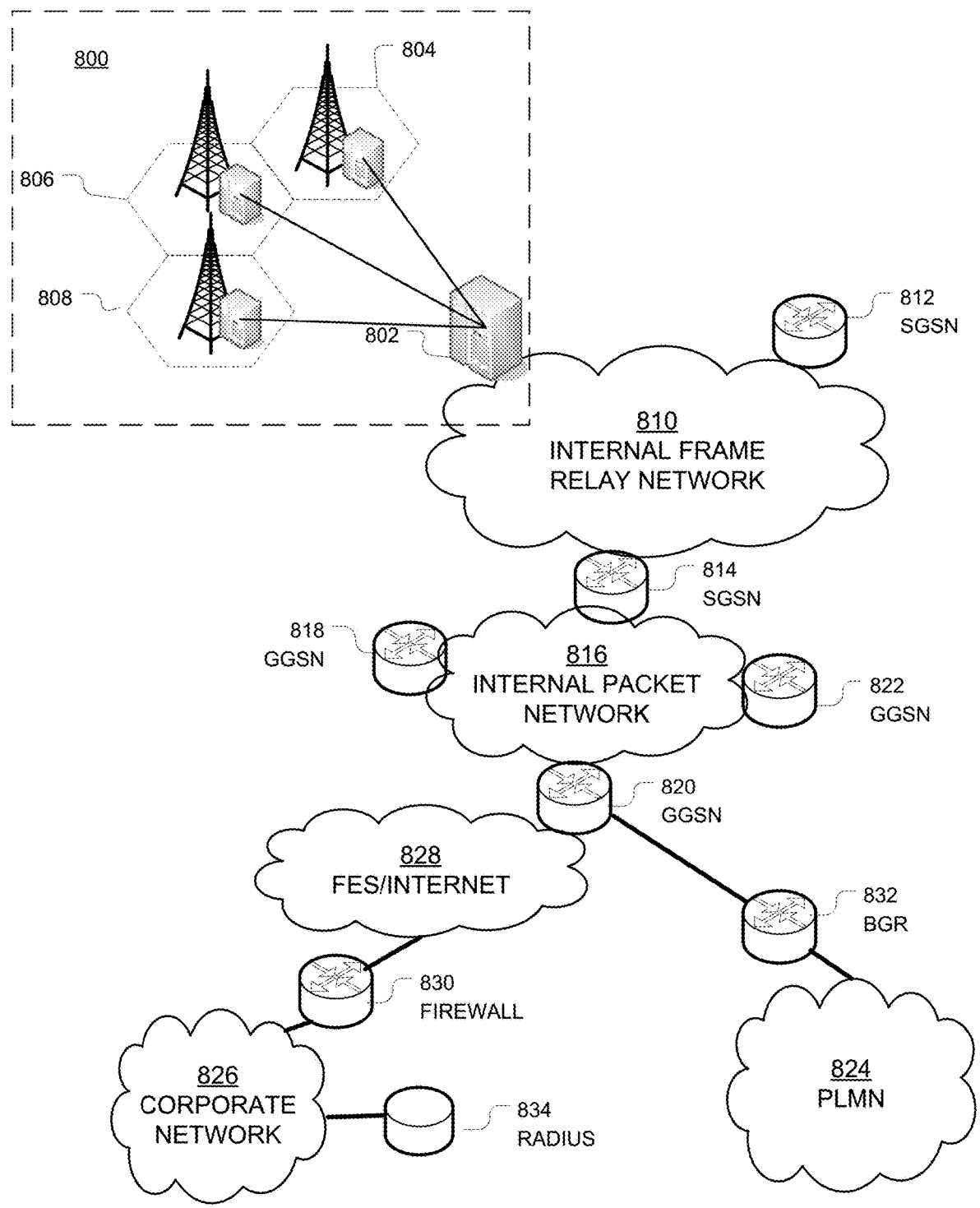
FIG. 8 depicts an overall block diagram of an example packet-based mobile cellular network environment.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
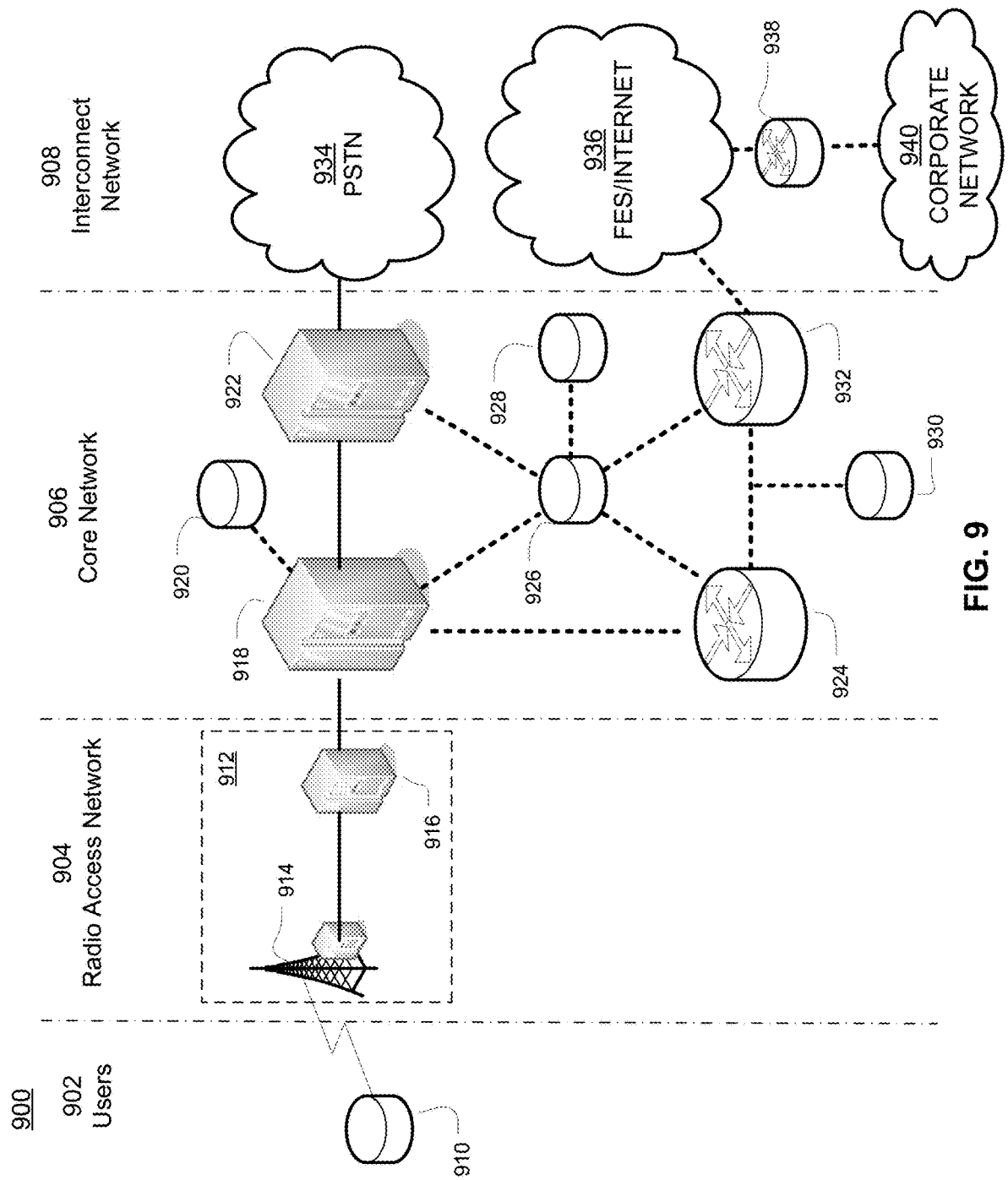
FIG. 9 illustrates an architecture of a typical GPRS network

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
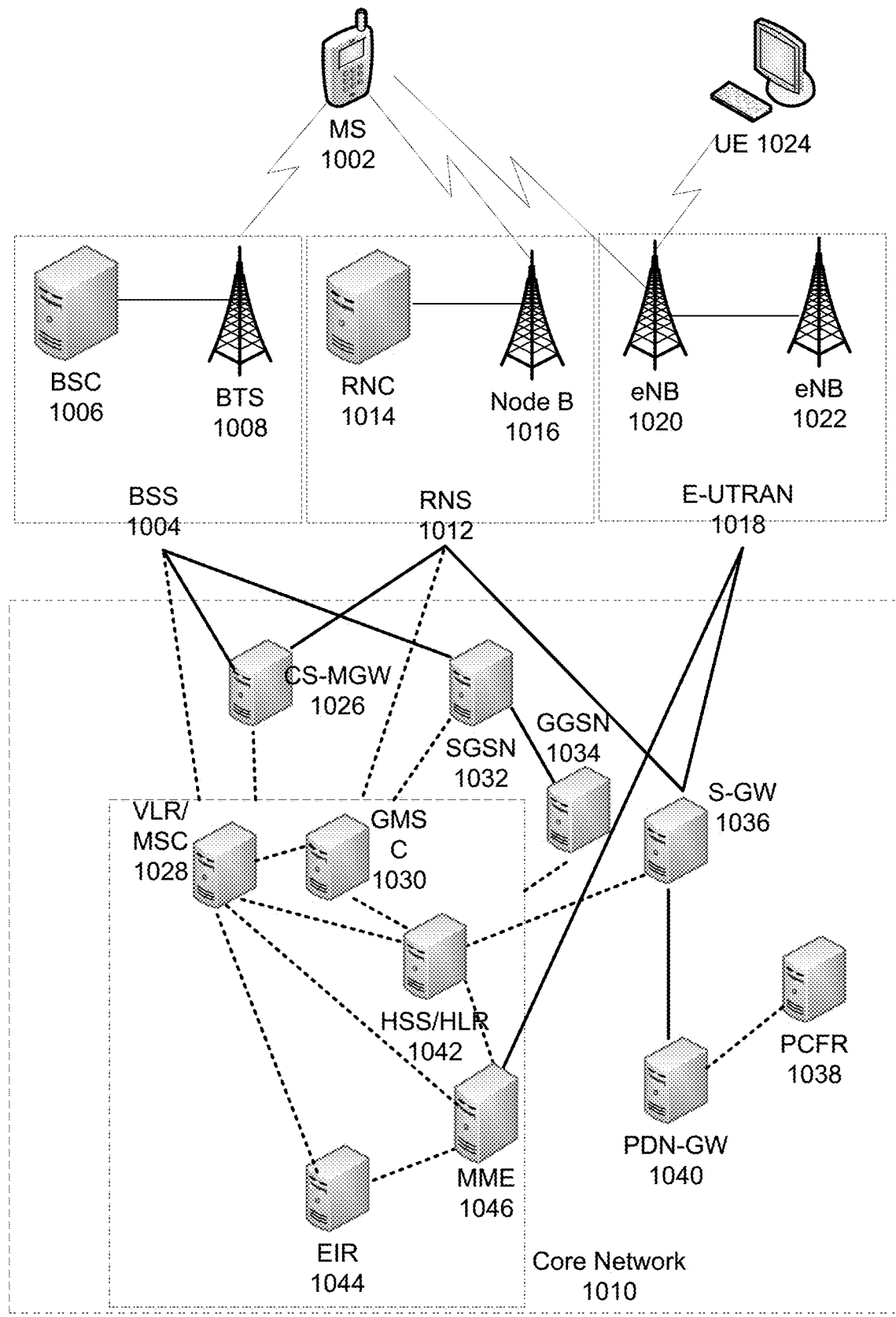
FIG. 10 illustrates a PLMN block diagram view of an example architecture that may be replaced by a telecommunications system

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life-especially for simple M2M devices-through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs. DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While example embodiments have been described in connection with various computing devices/processors, the underlying concepts can be applied to any computing device, processor, or system capable of recording events as described herein. The methods and apparatuses for recording and reporting events, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for distributing connectivity and/or transmission time. A computer-readable storage medium, as described herein is an article of manufacture, and thus, is not to be construed as a transitory signal. In the case of program code execution on programmable computers, which may, for example, include server 40, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations The methods and systems of the present disclosure may be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, a controller, or the like, the machine becomes an apparatus for use in reconfiguration of systems constructed in accordance with the present disclosure. When implemented on a general-purpose processor, the program code combines with the processor to provide a unique apparatus that operates to invoke the functionality described herein.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method comprising:
    receiving, by an application service layer, a request for a communication session, the request originating from a user device;
    developing, by the application service layer, a set of performance metrics associated with the request;
    forwarding, by the application service layer, the request to a master service orchestration layer along with the set of performance metrics, wherein the request and the set of performance metrics cause the master service orchestration layer to communicate with a radio access network (RAN) service control layer to identify RAN resources comprising a physical access network resource and a software defined network (SDN)-controlled access network resource, to communicate with a network service control layer to identify core network functions comprising a plurality of core physical network functions (PNFs) and core virtual network functions (VNFs), and to communicate with a content service control layer to identify one or more content network resources, wherein the plurality of core PNFs and core VNFs are identified in a functional matrix of core network functions, and wherein the network service control layer maintains a mapping table for synchronizing mobility of the user device with the functional matrix of core network functions; and
    connecting, by the application service layer, the user device to a network to establish, via allocation of the RAN resources, the core network functions, and the one or more content network resources, the communication session in accordance with the request and the set of performance metrics.

2. The method of claim 1 wherein the communication session is a request for content.

3. The method of claim 2 wherein the request comprises requesting that the master service orchestration layer coordinate provision of the communication session through the network core service control layer, the RAN service control layer and the content service control layer.

4. The method of claim 3 further comprising determining a content type and an encoding scheme and forwarding the content type and encoding scheme.

5. The method of claim 4 wherein the requesting step further comprises an acceleration algorithm.

6. The method of claim 1 further comprising coordinating, by the application service layer, with the master services orchestration layer to extract network resources to support the request.

7. The method of claim 6 wherein the coordinating step works on a per service chain or per application basis to support the request.

8. The method of claim 6 wherein the coordinating step comprises preparing content to be delivered via broadcast to the user device.

9. The method of claim 8 wherein the preparing step comprises preparing delivery of the content based on one of available network capacity, user demand, service offering, subscription and geographic location.

10. The method of claim 1 wherein the request includes a type of service request for the communication session.

11. The method of claim 1, further comprising:
    receiving, by the application service layer, a second request for a second communication session for a second user device;
    developing, by the application service layer, a second set of performance metrics associated with the second request;
    forwarding, by the application service layer, the second request to the master service orchestration layer along with the second set of performance metrics, wherein the second request and the second set of performance metrics cause the master service orchestration layer to communicate with the RAN service control layer to identify RAN resources, the network service control layer to identify core network functions, and the content service control layer to identify one or more content network resources, and wherein the network service control layer maintains a second mapping table for synchronizing mobility of the second user device with the functional matrix of core network functions; and connecting, by the application service layer, the second user device to the network to establish the second communication session in accordance with the second request and the second set of performance metrics.

12. The method of claim 1 wherein the connecting comprises establishing the communication session using a RAN resource, a core network function, and a content network resource by facilitating direct communications between the RAN service control layer, the network service control layer and the content service control layer.

13. The method of claim 12 further comprising tracking a performance metric for the communication session and adjusting capacity of one or more resources based on the tracking.

14. The method of claim 1 further comprising receiving, by the application service layer, current network status associated with a core network and wherein the set of performance metrics identifies network capacity in view of the current network status.

15. A system, comprising:
at least one processor associated with an application service layer; and
a memory that stores executable instructions that, when executed by the at least one processor, facilitate performance of operations, the operations comprising:
obtaining a request for a communication session, the request originating from a user device;
developing a set of performance metrics associated with the request;
forwarding the request to a master service orchestration layer along with the set of performance metrics, wherein the request and the set of performance metrics cause the master service orchestration layer to communicate with a radio access network (RAN) service control layer to identify RAN resources comprising a physical access network resource and a software defined network (SDN)-controlled access network resource, to communicate with a network service control layer to identify core network functions comprising a plurality of core physical network functions (PNFs) and core virtual network functions (VNFs), and to communicate with a content service control layer to identify one or more content network resources, wherein the plurality of core PNFs and core VNFs are identified in a functional matrix of core network functions, and wherein the network service control layer maintains a mapping table for synchronizing mobility of the user device with the functional matrix of core network functions; and
connecting the user device to a network to establish, via allocation of the RAN resources, the core network functions, and the one or more content network resources, the communication session in accordance with the request and the set of performance metrics.

16. The system of claim 15, wherein the communication session is a request for content.

17. The system of claim 15, wherein the request includes a type of service request for the communication session.

18. A non-transitory machine-readable medium, comprising executable instructions that, when executed by a processing system including a processor and associated with an application service layer, facilitate performance of operations, the operations comprising:
receiving a request for a communication session, the request originating from a user device;
generating a set of performance metrics associated with the request;
providing the request to a master service orchestration layer along with the set of performance metrics, wherein the request and the set of performance metrics cause the master service orchestration layer to communicate with a radio access network (RAN) service control layer to identify RAN resources comprising a physical access network resource and a software defined network (SDN)-controlled access network resource, to communicate with a network service control layer to identify core network functions comprising a plurality of core physical network functions (PNFs) and core virtual network functions (VNFs), and to communicate with a content service control layer to identify one or more content network resources, wherein the plurality of core PNFs and core VNFs are identified in a functional matrix of core network functions, and wherein the network service control layer maintains a mapping table for synchronizing mobility of the user device with the functional matrix of core network functions; and
connecting the user device to a network to establish, via allocation of the RAN resources, the core network functions, and the one or more content network resources, the communication session in accordance with the request and the set of performance metrics.

19. The non-transitory machine-readable medium of claim 18, wherein the communication session is a request for content.

20. The non-transitory machine-readable medium of claim 18, wherein the request includes a type of service request for the communication session.

* * * * *

UNITED STATES PATENT AND TRADEMARK OFFICE
CERTIFICATE OF CORRECTION

PATENT NO. : 11,558,907 B2
APPLICATION NO. : 16/893977
DATED : January 17, 2023
INVENTOR(S) : Rajendra Prasad Kodaypak et al.

It is certified that error appears in the above-identified patent and that said Letters Patent is hereby corrected as shown below:

In the Specification

-Column 4, Line 58, "104h" should read "104b".

-Column 5, Line 46, "LIE" should read "UE".

-Column 5, Line 62, "LTE, context" should read "UE, context".

-Column 6, Line 6, "LIE" should read "LTE".

-Column 6, Line 47, "LIE" should read "LTE".

-Column 6, Line 56, "\TNF" should read "VNF".

-Column 6, Line 61, "FIG. 2h" should read "FIG. 2b".

-Column 7, Line 52, "LIE" should read "LTE".

-Column 16, Line 63, "40X)" should read "400".

Signed and Sealed this
Twenty-eighth Day of February, 2023

Katherine Kelly Vidal
*Director of the United States Patent and Trademark Office*